P. P. THEISEN.
PIPE CONNECTION.
APPLICATION FILED DEC. 7, 1916.
1,341,086.
Patented May 25, 1920.
2 SHEETS—SHEET 2.
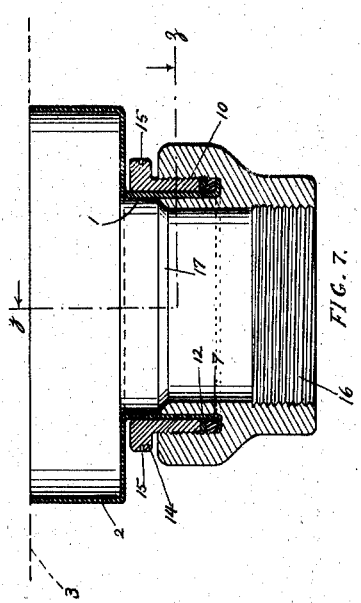
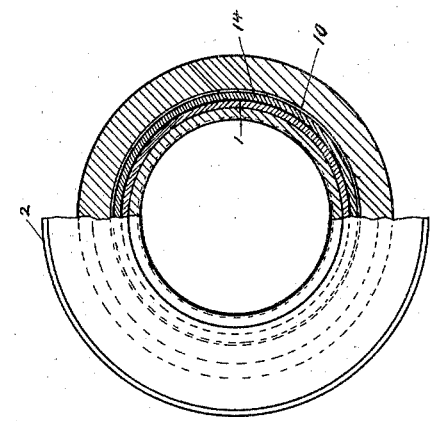
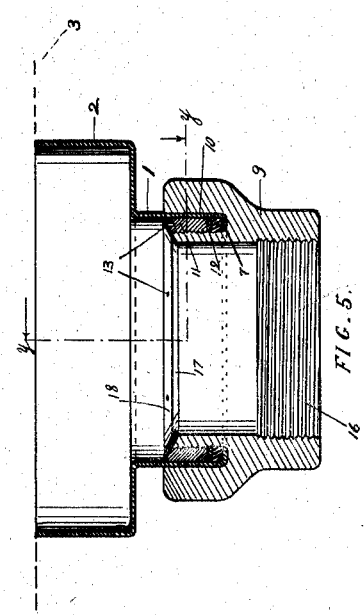
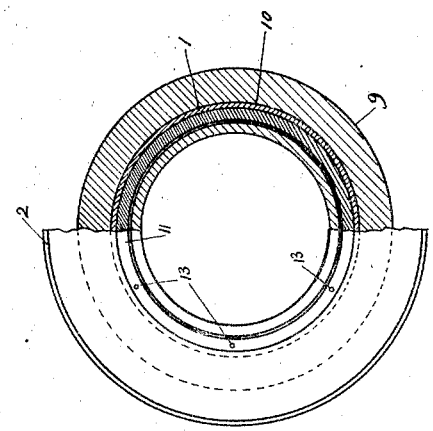
WITNESSES:
INVENTOR.
PETER PAUL THEISEN.
HIS ATTORNEY

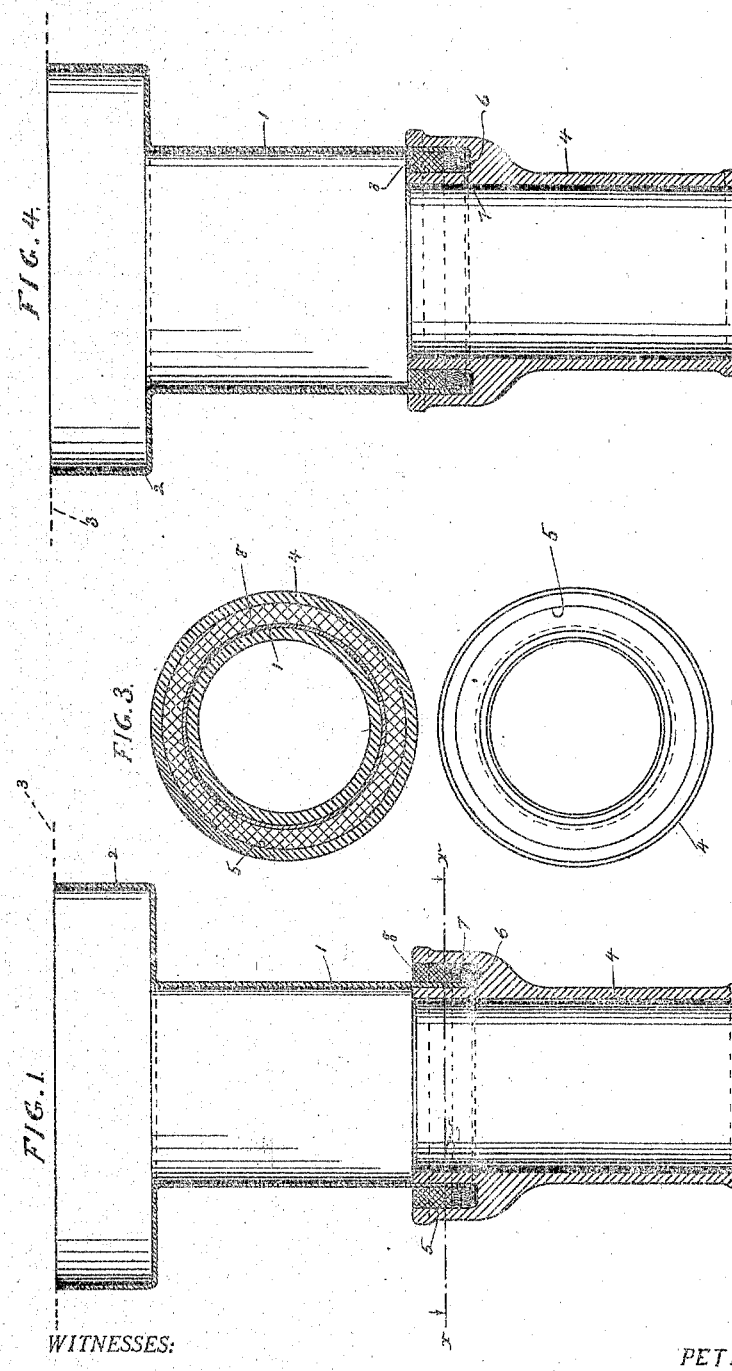

UNITED STATES PATENT OFFICE.

PETER PAUL THEISEN, OF CHICAGO, ILLINOIS.

PIPE CONNECTION.

1,341,086.    Specification of Letters Patent.    Patented May 25, 1920.

Application filed December 7, 1916. Serial No. 135,678.

*To all whom it may concern:*

Be it known that I, PETER PAUL THEISEN, a citizen of the United States, and a resident of the city of Chicago, county of Cook, and State of Illinois, have invented certain new and useful Improvements in Pipe Connections, of which the following is a specification.

My invention relates to improvements in pipe connections, and has for its object the production of a pipe connection designed for use particularly in connection with rain conductor pipes, which will afford means for readily effecting an absolutely tight connection with a rain conductor pipe. A further object is the production of a connection, as mentioned, which will be of extremely simple construction and highly efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a central vertical section illustrating a pipe connection embodying one form of the invention, Fig. 2 is a top plan view of the pipe connection alone, Fig. 3 is a section taken on line. x—x of Fig. 1, Fig. 4 is a view similar to Fig. 1 illustrating a slightly modified arrangement of the pipe which engages with the connection, Fig. 5 is a view similar to Fig. 4 illustrating a slightly modified form of construction, Fig. 6 is a section taken on substantially line y—y of Fig. 5, Fig. 7 is a view similar to Fig. 1 illustrating a slightly modified form of construction, and Fig. 8 is a section taken on line z—z of Fig. 7.

The pipe connection is designed for use particularly in connection with a rain conductor or soil pipe, the upper section of which, which is formed of sheet metal, being shown at 1. Said pipe section 1 is provided at its upper end with a rectangular box 2 which, when the pipe is in use, is countersunk in the roof of the building so that the upper edge of the box 2 is flush with the roof line 3.

At the present time great difficulty is experienced in effecting a connection with this upper section of the rain conductor pipe particularly because of the inaccessibility of the same, the result being that frequently the connection with said pipe connection is faulty and not tight. Where a good connection is established with connections now in use, the time consumed is very great which of course renders pipe connections, now in use, very undesirable.

In pipe connections employed at the present time, the upper end of the connection is formed with a shoulder for engagement with the lower end of the pipe to be engaged, but no means are provided at the inner side of the pipe connection to retain the packing in position during the assembling or connection of the two parts or to prevent the packing being worn away or disintegrated after the union has been completed.

This difficulty and objection has been overcome by applicant through the provision of a pipe connection in which the tubular body 4 of the connection is formed with an annular recess or groove 5 to receive the lower end of the rain conductor pipe section 1. Said lower end of said pipe 1 is formed, as seen in Fig. 1, with a laterally or transversely extending annular flange 6 which is adapted to rest upon the bottom of recess 5. Over said flange 6 is arranged a packing 7 of oakum, and over such packing is provided a retaining element 8 of lead. With this arrangement it will be seen that the pipe 1 will be securely locked to the connecting member 4, the arrangement being such as to permit of assembling of the parts with ease and expedition. The form shown in Fig. 4 is the same as that shown in Fig. 1 except that in Fig. 4 the pipe 1 is of larger diameter, the same being adapted to engage against the outer wall of the recess 5 instead of the inner wall as shown in Fig. 1, and an inwardly extending annular flange 6' is provided instead of the outwardly extending flange 6 of the first described form. The form of connection shown in Fig. 1 will be employed where the connection is readily accessible, but where it becomes necessary to effect the connection from the roof or through pipe 1, the form shown in Fig. 4 will be employed.

In Fig. 5 the body 9 of the connection is made shorter, but the same is provided with an annular recess 10 at its upper end the same as in the forms before described. In this form, however, instead of employing lead as the locking element, a collar or nut 11 is employed which is in threaded connection with the inner wall of recess 10. In order to prevent the lower or inner end of member 11 engaging with and thus displacing the packing 7, when said member 11 is rotated to position, a metallic washer or protecting ring 12 is interposed between the inner end of said member 11 and the packing, as clearly seen in Fig. 5. The upper or outer end of member 11 is provided at intervals with recesses or sockets 13 for the reception of a suitable tool for effecting rotation of said member.

The form shown in Fig. 7 is the same as that shown in Fig. 5 except that in this form the retaining element 14 encircles the pipe 1 and is formed at its upper end with laterally opening recesses 15 for the reception of a suitable tool for rotating the same. In this form also the retaining member is formed with exteriorly positioned screw threads for engagement with screw threads which are provided on the outer wall of the recess 10 as distinguished from the inner wall which, in the form shown in Fig. 5, is threaded.

The form shown in Fig. 7 is designed for use under the same conditions as that shown in Fig. 1, and the form shown in Fig. 5 is designed for use under the same conditions as the form shown in Fig. 4 before described. In the form shown in Figs. 5 and 7, the lower end of the connecting member 9 is internally threaded, as at 16, for engagement with adjoining pipe sections. In order to prevent obstruction to downward flow through the connection, the upper end of the connecting member or body may be beveled at its inner side, as shown at 17 in Figs. 5 and 7. Where the retaining member is arranged within the pipe 1, said retaining member may also be beveled as shown at 18.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a device of the class described, a countersunk roof drain box and depending pipe section, in combination with a tubular connecting member having an annular groove in one end for the reception of one end of said pipe section, said pipe end being adapted to fit snugly against one wall of said groove; a transversely extending flange provided on said end of said pipe section; and an annular locking member in threaded connection with the other wall of said recess and engaging over said flange of said pipe for locking said pipe and connecting member together, substantially as described.

2. A device as specified in claim 1, further characterized by a packing engaging against the outer side of said flange and a washer interposed between said locking member and said packing substantially as described.

In testimony whereof I have signed my name to this specification in the presence of two subscribing witnesses.

PETER PAUL THEISEN.

Witnesses:
 JOSHUA R. H. POTTS,
 CORA F. SCHIEBER.